US012417707B2

(12) United States Patent
Baek et al.

(10) Patent No.: US 12,417,707 B2
(45) **Date of Patent: *Sep. 16, 2025**

(54) METHOD AND APPARATUS FOR ASSISTING RIGHT TURN OF VEHICLE BASED ON UWB COMMUNICATION AT INTERSECTION

(71) Applicant: HYUNDAI MOBIS CO., LTD., Seoul (KR)

(72) Inventors: Song Nam Baek, Seoul (KR); Joung Ho Han, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 126 days.

This patent is subject to a terminal disclaimer.

(21) Appl. No.: 18/376,970

(22) Filed: Oct. 5, 2023

(65) Prior Publication Data

US 2024/0203260 A1 Jun. 20, 2024

(30) Foreign Application Priority Data

Dec. 15, 2022 (KR) ........................ 10-2022-0176194

(51) Int. Cl.
*G08G 1/16* (2006.01)

(52) U.S. Cl.
CPC .................................... *G08G 1/166* (2013.01)

(58) Field of Classification Search
CPC ........ G08G 1/166; G08G 1/161; G08G 1/005; G08G 1/163; G08G 1/167; B60W 30/08; B60W 2556/50; B60W 40/02; B60W 50/14; B60W 2050/143; H04W 4/029; H04W 4/80; H04W 4/40
See application file for complete search history.

(56) References Cited

U.S. PATENT DOCUMENTS

| | | | | |
|---|---|---|---|---|
| 2018/0326979 A1* | 11/2018 | Tsuruoka | ............ | B60W 10/184 |
| 2021/0206368 A1* | 7/2021 | Tsuruoka | .............. | B60W 30/09 |
| 2022/0340131 A1* | 10/2022 | Ito | ........................ | B60W 30/162 |
| 2023/0100834 A1* | 3/2023 | Kuno | ................ | B60W 30/0953 701/41 |
| 2023/0227033 A1* | 7/2023 | Sugawara | ....... | B60W 30/18159 701/301 |
| 2023/0341943 A1* | 10/2023 | Mani | ..................... | G06F 3/0416 |

* cited by examiner

*Primary Examiner* — Sisay Yacob
(74) *Attorney, Agent, or Firm* — Morgan, Lewis & Bockius LLP

(57) ABSTRACT

A method and an apparatus for assisting right turn of a vehicle based on UWB communication at an intersection are disclosed.
The right-turn assisting apparatus includes a communication unit including a first communication module configured to estimate positions of candidate terminals among pedestrian terminals around the intersection through a first communication protocol. The right-turn assisting apparatus further includes a controller configured to determine a risk of collision between a terminal of interest among the candidate terminals and the vehicle based on the positions of the candidate terminals in response to determination of at least one of an intersection approach of the vehicle or a turning intention of the vehicle, and warn of the risk of collision with the terminal of interest.

18 Claims, 15 Drawing Sheets

METHOD AND APPARATUS FOR ASSISTING RIGHT TURN OF VEHICLE BASED ON UWB COMMUNICATION AT INTERSECTION

CROSS REFERENCE TO RELATED APPLICATION

The present application is based on and claims the benefit of priority to Korean Patent Application Number 10-2022-0176194, filed on Dec. 15, 2022 in the Korean Intellectual Property Office, the entire disclosure of which is incorporated herein by reference.

TECHNICAL FIELD

The present disclosure relates to a method and an apparatus for assisting right turn of a vehicle based on UWB communication at an intersection.

BACKGROUND

The content described hereinbelow merely provides background information on the present disclosure and does not constitute the prior art.

Recently, for the purpose of protecting a pedestrian, traffic laws have been changed to prevent a collision with the pedestrian when a vehicle turns right at an intersection. For example, when a pedestrian is passing or is about to cross a crosswalk positioned on a vehicle's travel path, the vehicle must stop.

In order to prevent a pedestrian collision according to traffic laws, a driver of a vehicle may directly control the vehicle, but an Advanced Driver Assistance System (ADAS) of the vehicle may be used.

In order to implement Autonomous Emergency Braking (AEB) and Forward Collision Warning (FCW), which prevents a collision with a pedestrian, among the functions of the ADAS, the ADAS may detect a pedestrian using a sensor such as a camera, a high-resolution radar device, or a lidar device.

However, a sensor-based pedestrian detection is problematic in that it is difficult to accurately detect a pedestrian in a None Line of Sight (NLOS) environment, a bad weather environment, or a dark environment. In particular, it may be difficult for the ADAS to detect a pedestrian located on a side of a vehicle at an intersection or a pedestrian located outside the field of view (FoV) of a camera.

FIG. 1 is an illustrative diagram depicting a situation involving a vehicle and a pedestrian at an intersection.

Referring to FIG. 1, a vehicle 110 is turning right at an intersection, and a pedestrian 120 is about to cross a crosswalk.

The vehicle 110 detects an object using a camera provided in the vehicle 110, determines a risk of collision with a nearby object, and controls speed according to the risk of collision.

However, due to the limited field of view 130 of the camera, the vehicle 110 may not detect the pedestrian 120. Thus, a collision between the vehicle 110 and the pedestrian 120 may occur.

As another example, the ADAS may easily detect a pedestrian in a fine day, but may not detect a pedestrian in a dark environment or a bad weather condition such as snow or rain, or may detect a pedestrian only within a narrow field of view. In addition, even when sunlight is too strong, the ADAS may not detect pedestrians due to backlight.

Due to the limitations of these sensors, a lot of research is being conducted on a method of preventing a collision with a pedestrian through the wireless communication of a vehicle.

As a part of the research, vehicle-to-everything (V2X) communication technology is being developed. A V2X module may implement an object detection function by communicating with other V2X modules in a range of 500 m.

However, since the V2X module estimates a position based on a global navigation satellite system (GNSS), there is a problem in that positioning accuracy is low in an environment where a satellite signal is weakly received. Furthermore, since the V2X modules are applied only to some of vehicles and pedestrian terminals, vehicles and terminals having no V2X module may not detect an object or may not be detected as objects.

In order to solve the problems of the V2X module, Ultra-Wide Band (UWB) communication technology for the vehicle is being actively researched instead of V2X communication technology. The UWB communication method has a high-precision ranging positioning function of 20 cm to 50 cm, a radar function, and excellent security, compared to the V2X communication method. Furthermore, the penetration rate of the UWB communication module is increasing compared to that of the V2X communication module. The latest smartphones are equipped with UWB modules for various applications, and the vehicle is also equipped with UWB modules for smart key systems.

Therefore, there is a need for research into a method of preventing a pedestrian collision, particularly a method of efficiently and accurately detecting a pedestrian at an intersection, using the UWB communication technology with the high positioning accuracy and the high penetration rate.

SUMMARY

According to at least one embodiment, the present disclosure provides a right-turn assisting apparatus of a vehicle for preventing a collision with a pedestrian at an intersection. The right-turn assisting apparatus comprises a communication unit including a first communication module configured to estimate positions of candidate terminals among pedestrian terminals around the intersection through a first communication protocol. The right-turn assisting apparatus further comprises a controller configured to determine a risk of collision between a terminal of interest among the candidate terminals and the vehicle based on the positions of the candidate terminals in response to determination of at least one of an intersection approach of the vehicle or a turning intention of the vehicle, and warn of the risk of collision with the terminal of interest.

According to another embodiment of the present disclosure provides a method of controlling a right-turn assisting apparatus of a vehicle for preventing a collision with a pedestrian at an intersection. The method comprises estimating, by a first communication module and through a first communication protocol, positions of candidate terminals among pedestrian terminals around the intersection. The method further comprises determining, by a controller, a risk of collision between a terminal of interest among the candidate terminals and the vehicle based on the positions of the candidate terminals, in response to determination of at least one of an intersection approach of the vehicle or a turning intention of the vehicle. The method further comprises, by the controller, warning of the risk of collision with the terminal of interest.

DETAILED DESCRIPTION

Figure 1:
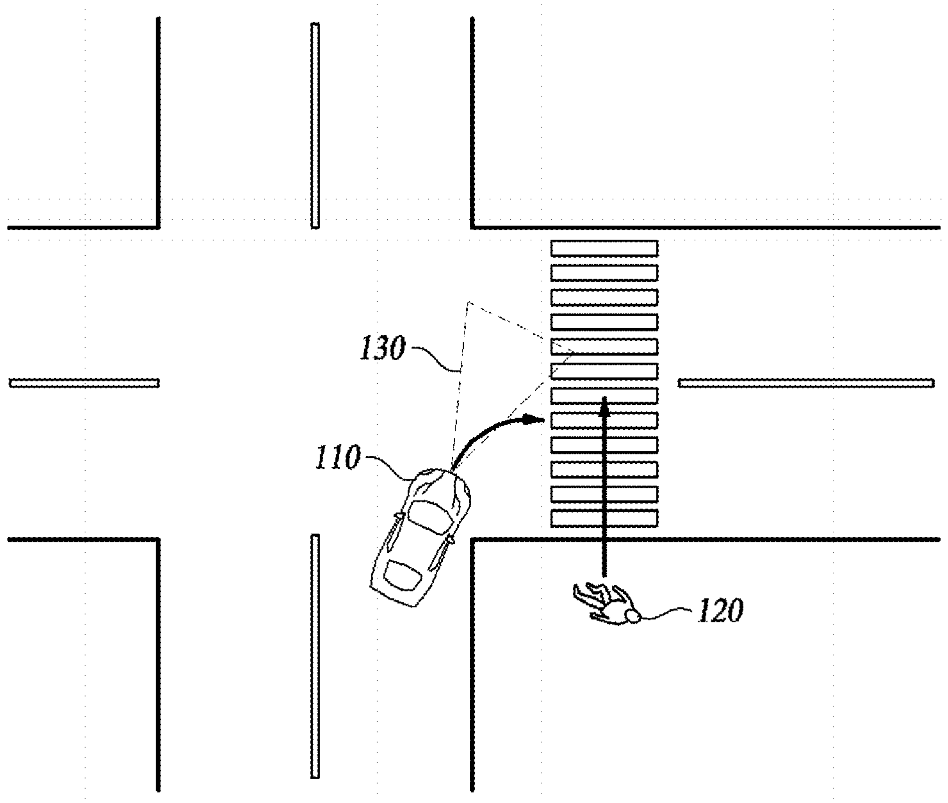
FIG. 1 (Prior Art)
FIG. 1 is an illustrative diagram depicting a situation involving a vehicle and a pedestrian at an intersection.

In view of the above, an embodiment provides an apparatus and method for assisting a right turn of a vehicle, which detects a pedestrian that a sensor cannot detect when a vehicle turns right at an intersection through first communication with a pedestrian terminal within a limited system having no V2X module, and accurately and precisely estimates the position of the pedestrian, thus effectively preventing a collision with a pedestrian.

An embodiment provides an apparatus and method for assisting a right turn of a vehicle, which uses a UWB module installed in the vehicle and a UWB module installed in a smartphone, thus being capable of performing a pedestrian collision prevention function with little system setup.

An embodiment provides an apparatus and method for assisting a right turn of a vehicle, which combines a Bluetooth module that operates with low energy and a UWB module that can perform high-precision positioning, thus allowing high-accuracy positioning to be performed at low power.

The objectives to be achieved by the present disclosure are not limited to the above-mentioned objectives, and other objectives which are not mentioned will be clearly understood by those skilled in the art from the following description.

The problems to be solved by the present disclosure are not limited to the problems mentioned above, and other problems not mentioned will be clearly understood by those skilled in the art from the following description.

Embodiments of the present disclosure are described below in detail using various drawings. It should be noted that when reference numerals are assigned to components in each drawing, the same components have the same reference numerals as much as possible, even if they are displayed on different drawings. Furthermore, in the description of the present disclosure, where it has been determined that a specific description of a related known configuration or function may obscure the gist of the disclosure, a detailed description thereof has been omitted.

In describing the components of the embodiments according to the present disclosure, symbols such as first, second, i), ii), a), and b) may be used. These symbols are only used to distinguish components from other components. The identity or sequence or order of the components is not limited by the symbols. In the specification, when a part “includes” or is “equipped with” an element, this means that the part may further include other elements, not excluding other elements unless explicitly stated to the contrary. Further, when an element in the written description and claims is described as being “for” performing or carry out a stated function, step, set of instructions, or the like, the element may also be considered as being “configured to” do so.

Each component of a device or method according to the present disclosure may be implemented in hardware or software, or in a combination of hardware and software. In addition, the functions of each component may be implemented in software. A microprocessor or processor may execute functions of the software corresponding to each component.

Figure 2:
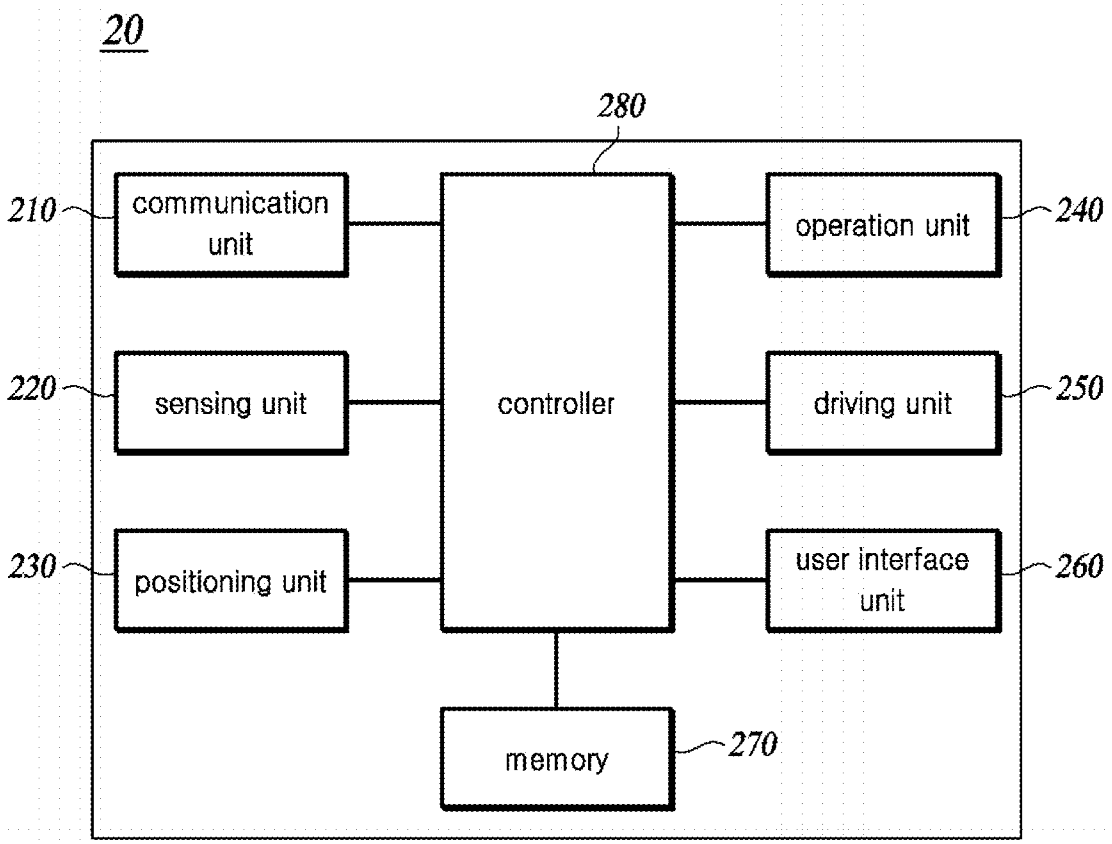
FIG. 2 is a diagram illustrating the configuration of a vehicle according to an embodiment of the present disclosure.

FIG. 2 is a diagram illustrating the configuration of a vehicle according to an embodiment of the present disclosure.

Referring to FIG. 2, a vehicle 20 includes at least one of a communication unit 210, a sensing unit 220, a positioning unit 230, an operation unit 240, a driving unit 250, a user interface unit 260, a memory 270, and a controller 280.

The communication unit 210 may exchange signals with devices positioned outside and inside the vehicle 20. The communication unit 210 may exchange a signal with at least one of an infrastructure device such as a server or a base station, another vehicle, and a terminal.

The communication unit 210 may include at least one of a transmission antenna, a reception antenna, a radio frequency (RF) circuit capable of implementing various communication protocols, and an RF element to perform communication.

The communication unit 210 may include an internal communication part and an external communication part.

The internal communication part may transmit or receive signals using various communication protocols present in the vehicle 20. In this regard, an internal communication protocol may include at least one of Controller Area Network (CAN), CAN with Flexible Data rate (CAN FD), ethernet, Local Interconnect Network (LIN), and FlexRay. The communication protocol may include other protocols for performing communication between various devices mounted on the vehicle.

The external communication part may perform communication with other vehicles, an infrastructure system, a base station, or a roadside device using various communication protocols. In this regard, the external communication protocol may include Vehicle-to-Everything (V2X) communication including Vehicle-to-Vehicle (V2V) communication, Vehicle-to-Infrastructure (V2I) communication, Vehicle-to-Network (V2N) communication, and Vehicle-to-Pedestrian (V2N) communication. The infrastructure may be, for example, a roadside unit or server that periodically transmits traffic information in conjunction with a Transportation Information System (TIS) or an Intelligent Transport System (ITS).

In addition, the external communication part may use various communication methods, such as vehicular ad hoc network (VANET), Wireless Access in Vehicular Environments (WAVE), Dedicated Short Range Communication (DSRC), Cellular-V2X (C-V2X) communication, Wireless LAN (WLAN) communication, Wireless-Fidelity (Wi-Fi) communication, Wireless Broadband (WiBro) communication, Long Term Evolution (LTE) communication, Long Term Evolution-Advanced (LTE-A) communication, 5G communication, 6G communication, Ultra Wideband (UWB) communication, Bluetooth communication, ZigBee communication, and Near Field Communication (NFC) communication.

C-V2X technology may include LTE-based sidelink communication and/or NR-based sidelink communication.

WAVE communication and DSRC communication are standards made to exchange signals with external devices based on IEEE 802.11p PHY/MAC hierarchy technology and IEEE 1609 Network/Transport hierarchy standard. WAVE communication and DSRC communication may provide Intelligent Transport System (ITS) services through dedicated short-range communication between vehicle-mounted devices or between a roadside device and a vehicle-mounted device. WAVE communication and DSRC communication adopt SAE J2735 and SAE J2945 standards. In particular, SAE J2735 relates to message standards, and defines a V2X message such as Basic Safety Message (BSM), Cooperative Awareness Message (CAM), and Decentralized Environmental Notification Message (DENM). The V2X message may include identification information, position information, speed information, time information, curvature-radius information, path history information, predicted path information, event information, size information, lighting information, state information, or turn-signal information of the vehicle 20.

According to an embodiment of the present disclosure, the communication unit 210 supports Ultra-Wide Band (UWB) communication. UWB communication adopts an impulse radio (IR) method as described in IEEE 802.15.4a standard and IEEE 802.15.4z, and uses a 2 ns pulse for measuring Time of Flight (ToF) and Angle of Arrival (AoA). The UWB communication adopts a safe precise ranging and sensing method as specified in IEEE 802.15.4z.

According to another embodiment of the present disclosure, the communication unit 210 includes a UWB module using a UWB communication protocol, and a BLE module using a Bluetooth at Low Energy (BLE) communication protocol.

The sensing unit 220 may sense the state of the vehicle 20 and an external object.

In order to sense the state of the vehicle 20, the sensing unit 220 may include at least one of an inertial measurement unit (IMU), a distance measuring instrument (DMI), a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, a ultrasonic sensor, an illuminance sensor, and a pedal position sensor. On the other hand, the IMU sensor may include one or more of an acceleration sensor, a gyro sensor, and a magnetic sensor. The sensing unit 220 may generate state data of the vehicle, based on a signal generated from at least one sensor. For example, direction information such as the heading and yaw rate of the vehicle 20 may be collected by the sensing unit 220.

In order to sense the external object, the sensing unit 220 may include at least one of a camera, a radar sensor, a Light Detection and Ranging (LiDAR) sensor, an ultrasonic sensor, and an infrared sensor. The sensing unit 220 may measure at least one of information about the presence or absence of an object, information about a position of an object, information about a distance between the vehicle 20 and an object, information about relative speed between the vehicle 20 and an object.

The positioning unit 230 may generate position data of the vehicle 20.

The positioning unit 230 may include at least one of a Global Positioning System (GPS), a Differential Global Positioning System (DGPS), or a Global Navigation Satellite System (GNSS). The positioning unit 230 may generate the position data of the vehicle 20 based on a signal generated from at least one of the GPS, the DGPS or the GNSS.

The positioning unit 230 may estimate the position of the vehicle 20 based on wireless signals received from the communication unit 210.

The positioning unit 230 may estimate the current position of the vehicle 20 based on the previous position, travel distance information, moving time information, speed information, or acceleration information of the vehicle 20 using the IMU or DMI.

According to an embodiment of the present disclosure, the positioning unit 230 may estimate the position of the vehicle 20 based on UWB signals received from the communication unit 210.

Meanwhile, the controller 280 may estimate the path history and path prediction of the vehicle 20 based on the position information of the vehicle 20 collected by the positioning unit 230.

The operation unit 240 receives a user input for driving. In a manual mode, the vehicle 20 may be driven based on a signal provided by the operation unit 240. The operation unit 240 may include a steering input device such as a steering wheel, an acceleration input device such as an accelerator pedal, and a brake input device such as a brake pedal.

The driving unit 250 is a device that electrically controls various vehicle driving devices in the vehicle 20. The driving unit 250 may include a power train driving control device, a chassis driving control device, a door/window driving control device, a safety device driving control device, a lamp driving control device, and an air conditioning driving control device.

The driving unit 250 controls the movement of the vehicle 20 based on the input signal of the manipulation unit 240 or the control signal of the controller 280.

The user interface unit 260 is a device for communication between the vehicle 20 and a user. The user interface unit 260 may receive a user input and provide information generated in the vehicle 20 to the user. The vehicle 20 may implement a user interface (UI) or user experience (UX) through the user interface unit 260.

The user interface unit 260 may include an input device such as a keyboard or a mouse, and may include an output device such as a display device or a printer.

According to an embodiment of the present disclosure, the user interface unit 260 may output a collision risk warning in the form of audio, video, or vibration by the controller 280.

The memory 270 may store a program that causes a processor 720 to perform a method according to an embodiment of the present disclosure. For example, the program may include a plurality of commands executable by the processor, and the method according to an embodiment of the present disclosure may be performed by executing the plurality of commands by the processor.

The memory 270 may be a single memory or a plurality of memories. When the memory 270 is formed of the plurality of memories, the plurality of memories may be physically separated.

The memory 270 may include at least one of a volatile memory and a non-volatile memory. The volatile memory includes a Static Random Access Memory (SRAM) or a Dynamic Random Access Memory (DRAM), while the non-volatile memory includes a flash memory.

The memory 270 stores map information. The map information may be any one of a navigation map, an ADAS map, or a High Definition map (HD map). In a limited collision prevention system, the map information refers to the navigation map.

The navigation map includes a node indicating a point where at least two roads meet, and a link connecting the two nodes. The navigation map may include geographic information, road information, lane information, building information, or signal information.

The ADAS map incorporates more specific data compared to the navigation map. The ADAS map may include road gradient, road curvature, or sign information, based on a road.

The HD map incorporates more specific data compared to the ADAS map. The HD map may include lane information, lane boundary information, stop line position, traffic light position, signal sequence, or intersection information, based on a lane. The HD map may include basic road information, surrounding environment information, detailed road environment information, or dynamic road condition information. The detailed road environment information may include static information such as elevation of terrain, curvature, lane, lane centerline, regulation line, road boundary, road centerline, traffic sign, road surface sign, shape and height of the road, lane width, and the like. The dynamic road condition information may include traffic congestion, an accident section, a construction section, and the like. The HD map may include road surrounding environment information implemented in 3D, geometric information such as road shape or facility structure, and semantic information such as traffic signs or lane marks.

According to an embodiment of the present disclosure, the memory 270 may further store identification (ID) information of each intersection and the position information of the intersection. The position information of the intersection may include a central position within the intersection.

The controller 280 may include at least one core capable of executing at least one command. The controller 280 may execute the command stored in the memory 270. The controller 280 may be a single processor or a plurality of processors.

According to an embodiment of the present disclosure, the controller 280 may determine the intersection approach of the vehicle 20, detect the turning intention of the vehicle 20, estimate the positions of terminals of pedestrians, determine the risk of collision between the vehicle 20 and the pedestrian, and warn of the risk of collision. In this regard, the pedestrian may be referred to as a Vulnerable Road User (VRU).

Figure 3:
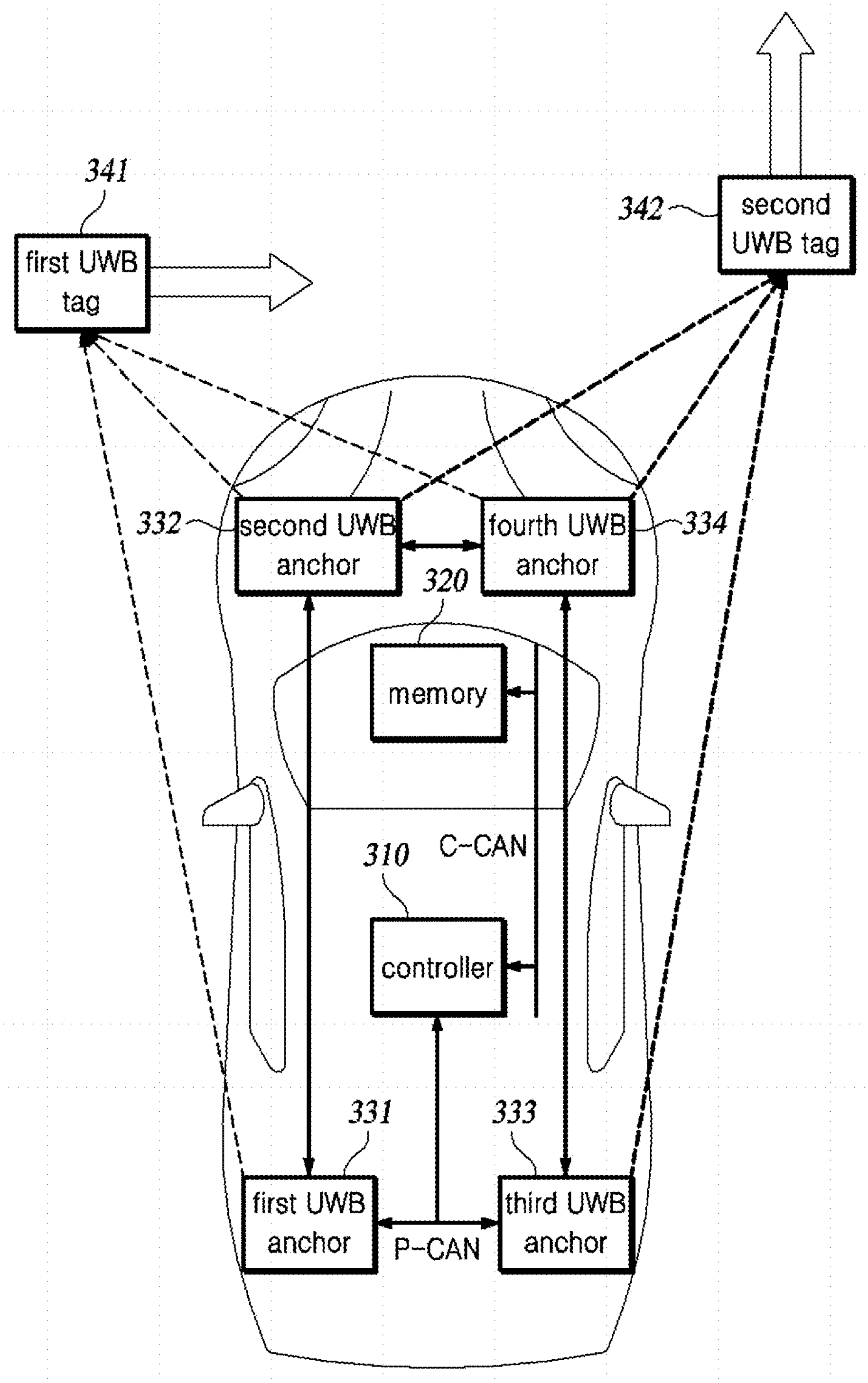
FIG. 3 is a diagram illustrating the configuration of a right-turn assisting system according to an embodiment of the present disclosure.

FIG. 3 is a diagram illustrating the configuration of a right-turn assisting system according to an embodiment of the present disclosure.

According to an embodiment of the present disclosure, the right-turn assisting system includes a terminal that includes a UWB module, and a vehicle including at least two UWB modules and a memory storing map information. The right-turn assisting system uses only the UWB modules instead of V2X communication and an autonomous sensor, and performs a right-turn assistance algorithm with limited hardware components.

Referring to FIG. 3, the vehicle includes a controller 310, a memory 320, and a plurality of UWB anchors 331, 332, 333, and 334. The controller 310 of the vehicle determines the risk of collision between the vehicle and a pedestrian based on the map information stored in the memory 320 and UWB communication between the UWB tags 341 and 342 and the plurality of UWB anchors 331, 332, 333 and 334, and warns of the risk of collision.

Although the vehicle includes four UWB anchors, at least two UWB anchors may be included so as to estimate the position of the UWB tag in another embodiment. On the other hand, the vehicle may further include a Bluetooth communication module to designate a candidate terminal.

It is assumed that each pedestrian possesses the terminal. The terminal of each pedestrian includes the UWB tag. The first UWB tag 341 and the second UWB tag 342 may be handled in the same manner as the terminals of the pedestrians.

When an intention of the vehicle to turn is detected, the controller 310 may activate the plurality of UWB anchors 331, 332, 333, and 334.

When the first UWB tag 341 and the second UWB tag 342 are within the vehicle's UWB communication range, the plurality of UWB anchors 331, 332, 333, and 334 establish the session connection with each of the first UWB tag 341 and the second UWB tag 342. For instance, the first UWB tag 341 periodically broadcasts a blink signal. When the second UWB anchor 332 receives the blink signal, the second UWB anchor 332 transmits a response signal to the first UWB tag 341. Through this process, the session connection is established between the first UWB tag 341 and the second UWB anchor 332. Moreover, each of the first UWB tag 341 and the second UWB tag 342 may be paired with the plurality of UWB anchors 331, 332, 333, and 334.

Hereinafter, a positioning operation based on Two-Way Ranging (TWR) will be described.

The plurality of UWB anchors 331, 332, 333, and 334 exchange UWB signals with the first UWB tag 341 and the second UWB tag 342. The controller 310 estimates the positions of the first UWB tag 341 and the second UWB tag 342 based on the UWB signals received through the plurality of UWB anchors 331, 332, 333, and 334.

Specifically, the first UWB tag 341 transmits a polling message to the second UWB anchor 332. The first UWB tag 341 records a transmission time t1 of the polling message.

The second UWB anchor 332 transmits a response message to the polling message. The second UWB anchor 332 records a reception time t2 of the polling message and a transmission time t3 of the response message.

The first UWB tag 341 records a reception time t4 of the response message. The first UWB tag 341 transmits a round-trip time message including a time difference between the transmission time t1 of the polling message and the reception time t4 of the response message to the second UWB anchor 332, and records the transmission time t5 of the round-trip time message.

The second UWB anchor 332 records the reception time t6 of the round-trip time message, and calculates a time difference between the transmission time t3 of the response message and the reception time t6 of the round-trip time message.

The second UWB anchor 332 calculates ToF through Equation 1.

$$ToF = \frac{[\{(t_4 - t_1) - (t_3 - t_2)\} + \{(t_6 - t_3) - (t_5 - t_4)\}]}{4} \quad \text{[Equation 1]}$$

The second UWB anchor 332 calculates a distance to the first UWB tag 341 by dividing the ToF by the propagation speed of light.

Through the above process, distances between the first UWB tag 341 and the plurality of UWB anchors 331, 332, 333, and 334 are calculated.

The position of the first UWB tag 341 is estimated by applying triangulation, trilateration, multilateration, etc. to the calculated distances or by applying the angle of arrival derived from the calculated distances.

The controller 310 may express the positions of the first UWB tag 341 and the second UWB tag 342 on a coordinate system having the position of the vehicle as an origin.

According to an embodiment of the present disclosure, since the vehicle including the plurality of UWB anchors 331, 332, 333, and 334 performs positioning by measuring a distance using time when it takes for the UWB signal to travel between two points, such as the ToF of the signal, Time Difference of Arrival (TDoA), or AoA, more accurate positioning is possible than a signal intensity-based positioning method. Specifically, a Wi-Fi-based positioning or Bluetooth-based positioning method estimates the position of the terminal based on the intensity of radio waves. However, since the signal intensity is distorted by an obstacle or a reflector, the positioning method based on the signal intensity has low positioning accuracy. However, since the ToF-based positioning method performs positioning based on the travel time of the signal that is not affected by external environment, positioning accuracy is high. Moreover, since the UWB communication has a wide frequency range, a pulse signal with a short time width may be used. This makes it possible to measure a distance in centimeters.

Moreover, the vehicle may estimate the directions of the UWB tags 341 and 342 using communication between the plurality of UWB anchors 331, 332, 333, and 334 and the UWB tags 341 and 342.

Figure 4:
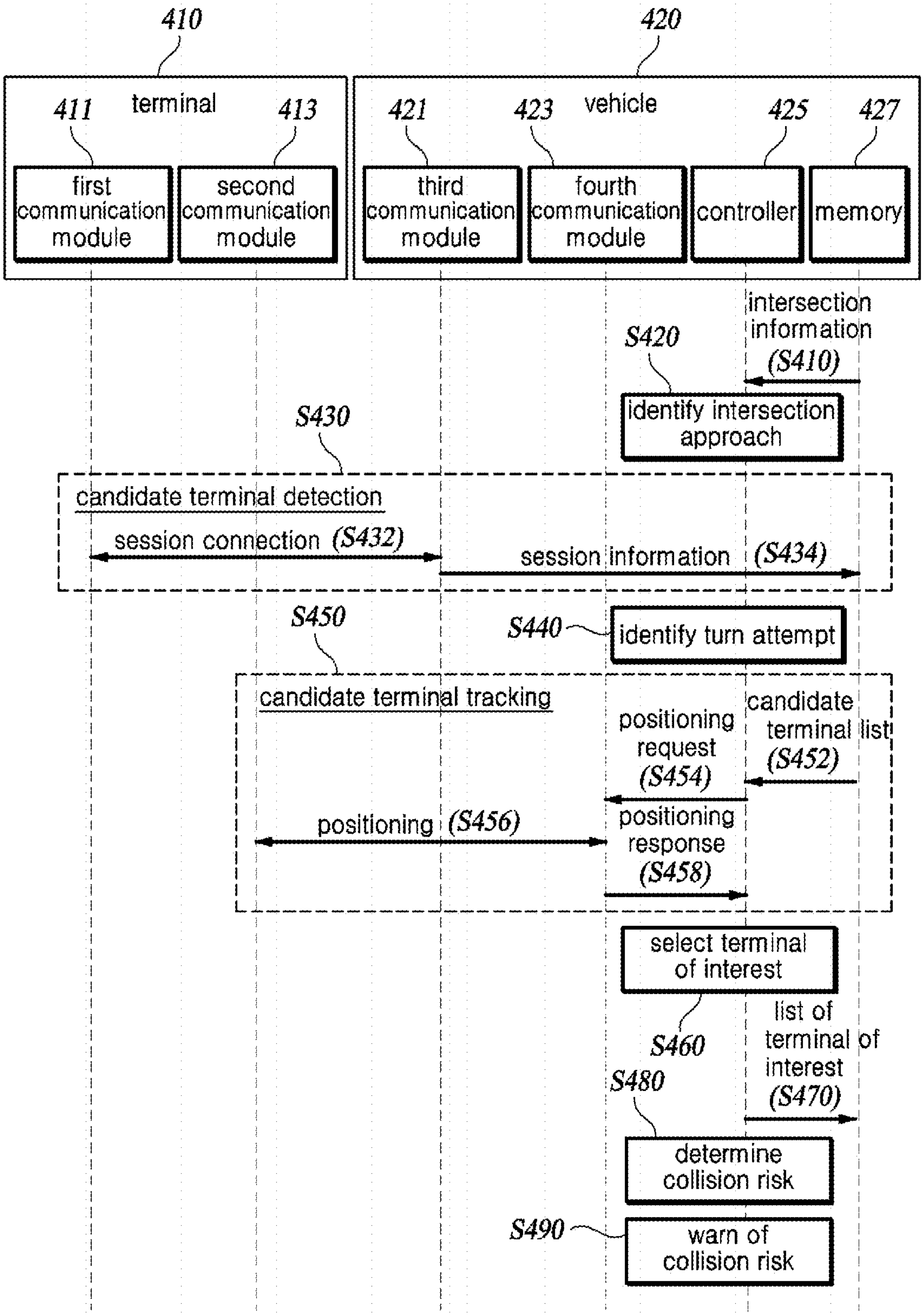
FIG. 4 is a flowchart of a right-turn assisting method of a vehicle according to an embodiment of the present disclosure.

FIG. 4 is a flowchart of a right-turn assisting method according to an embodiment of the present disclosure.

Referring to FIG. 4, a right-turn assisting system includes a terminal 410 and a vehicle 420. The pedestrian terminal 410 includes a second communication module 413, and may further include a first communication module 411. The vehicle 420 includes a fourth communication module 423, a controller 425, and a memory 427, and may further include a third communication module 421. The third communication module 421, the fourth communication module 423, the controller 425, and the memory 427 of the vehicle 420 may constitute a right-turn assisting apparatus.

Here, the first communication module 411 and the third communication module 421 support a first communication protocol. The second communication module 413 and the fourth communication module 423 support a second communication protocol. Here, the first communication protocol and the second communication protocol may be a Bluetooth at low energy (BLE) communication protocol and a UWB communication protocol, respectively. The BLE communication protocol has lower power and a wider communication range than the UWB communication protocol, whereas the UWB communication protocol has higher positioning accuracy than the BLE communication protocol. The vehicle 420 accurately estimates the position of the terminal 410 based on the second communication protocol so as to prevent a collision with the terminal 410. Furthermore, the vehicle 420 may use the first communication protocol for power management.

First, the controller 425 receives intersection information from the memory 427 (S410).

In detail, the controller 425 receives map information from the memory 427 of the vehicle 420. The map information includes intersection information, and the intersection information includes the ID of the intersection around the vehicle 420 and the central position of the intersection, and may further include a distance between the vehicle 420 and the central position of the intersection. The position of the intersection may be a position that is manually set.

The controller 425 identifies an intersection approach of the vehicle 420 (S420).

Specifically, the controller 425 obtains an approach distance between the central position of the intersection and the vehicle, determines the travel distance of the vehicle using an inertial measurement unit (IMU) and a distance measurement instrument (DMI), and determines the intersection approach of the vehicle by comparing the approach distance and the travel distance. When a distance between the position of the vehicle 420 and the central position of the intersection is shorter than a preset first threshold distance, the controller 425 determines that the vehicle 420 is approaching the intersection. For example, when the distance to the position of the intersection is less than 50 m, the controller 425 may determine that the vehicle 420 is approaching the intersection.

According to another embodiment of the present disclosure, as the distance between the position of the vehicle 420 and the position of the intersection is decreased over time, the controller 425 may determine that the vehicle 420 is approaching the intersection.

According to another embodiment of the present disclosure, when receiving a message including an intention to cross the intersection or an intention to cross a crosswalk from the terminal 410, the controller 425 may determine that the vehicle 420 is approaching the intersection.

When it is determined that the vehicle 420 is approaching the intersection, the third communication module 421 may be activated. Meanwhile, the third communication module 421 may be deactivated when it is out of a predetermined radius from the position of the intersection.

The vehicle 420 may detect a candidate terminal among surrounding terminals using the third communication module 421 (S430).

Specifically, the third communication module 421 of the vehicle 420 establishes a session connection with the first communication module 411 of the terminal 410 (S432). The terminal 410 that is session connected to the vehicle 420 becomes the candidate terminal. That is, the vehicle 420 detects, as the candidate terminal, the terminal connected to the third communication module 421 through the first communication protocol. When the session connection is established, the third communication module 421 transmits session information to the memory 427 (S434). Here, the session information includes the ID of the session, a signal intensity, etc.

Information on candidate terminals may be managed in the form of a table. The memory 427 may record session IDs and signal intensities for the candidate terminals in the table, and may periodically update the table. If the signal intensity is not updated for a predetermined time interval or update interval, the corresponding session ID may be deleted from the table.

As will be described later, the fourth communication module 423 of the vehicle 420 may perform positioning only on candidate terminals among surrounding terminals. The vehicle 420 may reduce the number of terminals performing positioning in the tracking of the candidate terminal (S450) through the detection of the candidate terminal (S430).

However, the detection of the candidate terminal (S430) may be omitted if necessary.

Thereafter, the controller 425 identifies a turn attempt of the vehicle 420 (S440).

Specifically, the controller 425 determines the turning intention of the vehicle 420 based on at least one of the turn signal or the navigation path of the vehicle 420. For example, the controller 425 determines that the vehicle 420 attempts to turn right when the right-turn signal of the vehicle is turned on. As another example, the controller 425 determines that the vehicle 420 is attempting the right turn when the navigation path includes a right-turn path at the intersection. Here, the navigation path represents a path that is set to a destination by the navigation device of the vehicle 420.

In order to determine the turning intention of the vehicle 420, the controller 425 may further use the speed of the vehicle 420. For example, when the right-turn signal of the vehicle 420 is detected and the speed of the vehicle 420 is lower than a preset first threshold speed, the controller 425 may determine that the vehicle 420 attempts to turn right.

When the turning intention of the vehicle 420 is detected, the fourth communication module 423 is activated.

The vehicle 420 tracks the positions of the candidate terminals using the fourth communication module 423 (S450).

Specifically, the controller 425 receives a candidate terminal list from the memory 427 (S452). The candidate terminal list relates to terminals that are session connected according to a first communication protocol.

The controller 425 transmits a positioning request to the fourth communication module 423 (S454). The controller 425 may request positioning only for terminals having session IDs recorded in the candidate terminal list.

The fourth communication module 423 performs positioning through communication with the second communication module 413 (S456). When the fourth communication module 423 of the vehicle 420 is the UWB anchor and the second communication module 413 of the terminal 410 is the UWB tag, the fourth communication module 423 of the vehicle 420 may estimate the position of the terminal 410 using the positioning method described in FIG. 3.

According to an embodiment of the present disclosure, positioning may be performed starting from candidate terminals having high signal intensity according to the first communication protocol. That is, the fourth communication module 423 may estimate the positions of the candidate terminals based on priority according to the BLE received signal intensity: When the signal intensity of the first communication module 411 of the terminal 410 is higher than those of surrounding terminals, the fourth communication module 423 of the vehicle 420 preferentially estimates the position of the terminal 410 over other terminals. Since a high signal intensity means a position close to the vehicle 420, the vehicle 420 may preferentially position a terminal having a high collision risk.

The controller 425 receives a positioning response including the position of the terminal 410 from the fourth communication module 423 (S458).

The controller 425 obtains the positions of the candidate terminals. The controller 425 may track the candidate terminals by continuously updating the positions of the candidate terminals. Furthermore, the controller 425 may generate the path history and the path prediction of each of the candidate terminals using the positions of the candidate terminals, or may receive the path history and the path prediction from each of the candidate terminals.

The controller 425 selects a terminal of interest from candidate terminals (S460).

Specifically, the controller 425 classifies the candidate terminals according to the positions and directions of the candidate terminals, and selects a candidate terminal approaching the vehicle among the classified candidate terminals as a terminal of interest. Here, the direction of the candidate terminal indicates any one of a geomagnetic direction, a movement direction, a path history direction, or a predicted path direction.

Figure 5:
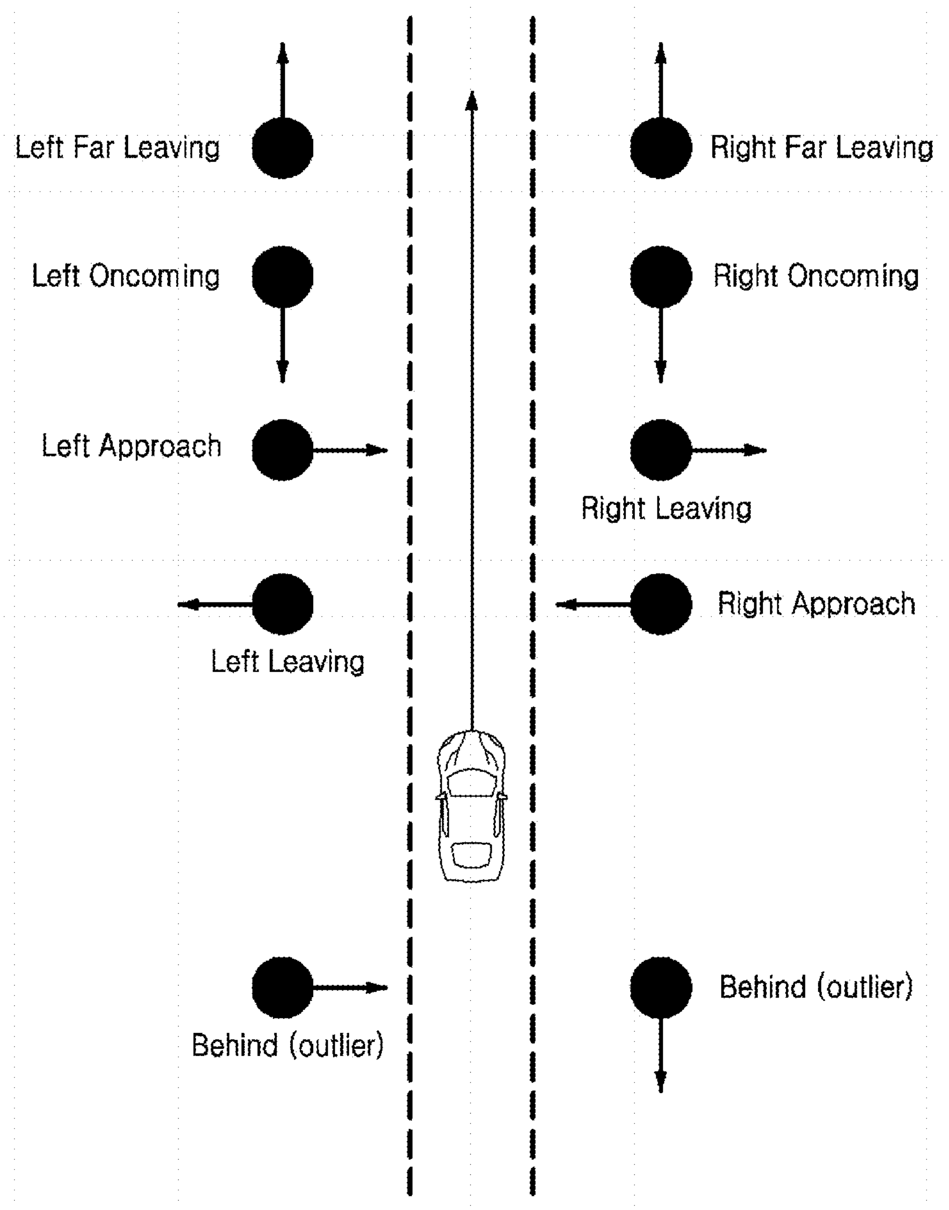
FIG. 5 is a diagram illustrating the result of classifying movement directions based on the positions of terminals, according to an embodiment of the present disclosure.

FIG. 5 is a diagram illustrating the result of classifying movement directions based on the positions of terminals, according to an embodiment of the present disclosure.

Referring to FIG. 5, the terminals are classified according to a total of 9 classes. Specifically, the terminals are classified according to the positions of the terminals relative to the lane of the vehicle and the directions of the terminals relative to the moving direction of the vehicle.

As classification classes, there are a first movement type (Left Leaving) having a direction leaving from the direction of the vehicle at the left position of the vehicle, a second movement type (Left Approach) having a direction approaching the direction of the vehicle at the left position, a third movement type (Left Oncoming) having a direction opposite to that of the vehicle at the left position, a fourth movement type (Left Far Leaving) having the same direction as that of the vehicle at the left position, a fifth movement type (Right Approach) having a direction approaching the direction of the vehicle at the right position of the vehicle, a sixth movement type (Right Leaving) having a direction leaving from the direction of the vehicle at the right position, a seventh movement type (Right Oncoming) having a direction opposite to the direction of the vehicle at the right position, an eighth movement type (Right Far Leaving) having the same direction as the direction of the vehicle at the right position, and a movement type (Behind) having a rear position of the vehicle.

All terminals positioned behind the vehicle and corresponding to a ninth movement type are classified as outliers.

This is a terminal having any one of the second movement type, the third movement type, the fifth movement type, the seventh movement type, and the eighth movement type, which correspond to the terminal of interest. The second movement type, the third movement type, the fifth movement type, the seventh movement type, and the eighth movement type may be previously defined as a preset target movement type.

Referring back to FIG. 4, the controller 425 may select the terminal 410 as the terminal of interest according to the movement type of the terminal 410.

The controller 425 stores the list of terminals of interest in the memory 427 (S470).

Subsequently, in the tracking of the candidate terminal (S450), power consumption may be reduced by tracking only terminals recorded in the list of terminals of interest stored in the memory 427.

The controller 425 determines the risk of collision with a pedestrian carrying the terminal 410 selected as the terminal of interest (S480).

Specifically, the controller 425 determines an expected movement area according to a position and a direction of the terminal 410. For instance, the controller 425 may identify an expected movement area of a predetermined size in the direction of the terminal 410 from the position of the terminal 410.

Thereafter, based on whether a part of the expected movement area is within a predetermined radius from the vehicle 420, the controller 425 determines that the expected movement area is the dangerous area. For example, when a circle having the position of the vehicle 420 as a center and having a preset radius overlaps the expected movement area, the controller 425 may determine the expected movement area as a dangerous area. In other words, when the distance between the expected movement area and the vehicle is shorter than the preset second threshold distance, the controller 425 determines the expected movement area as the dangerous area.

Subsequently, the controller 425 determines the risk of collision between the terminal 410 and the vehicle 420 within the dangerous area.

According to an embodiment of the present disclosure, when the terminal 410 enter the dangerous area, the controller 425 determines that there is a risk of collision.

According to an embodiment of the present disclosure, the controller 425 determines the risk of collision based on whether the terminal of interest has entered the dangerous area, and based on a vehicle speed. For example, when the terminal 410 has entered the dangerous area and the speed of the vehicle 420 is faster than a preset second threshold speed, the controller 425 determines that there is a risk of collision. The second threshold speed may be 10 km/h, which is lower than the first threshold speed of 30 km/h.

According to another embodiment of the present disclosure, when the direction of the terminal 410 intersects the navigation path of the vehicle 420, the controller 425 determines that there is a risk of collision.

According to another embodiment of the present disclosure, the controller 425 determines the risk of collision based on whether the direction of the terminal of interest and the navigation path of the vehicle intersect within the dangerous area, and the speed of the vehicle. For example, when an intersection between the direction of the terminal 410 and the navigation path of the vehicle 440 exists within the dangerous area and the speed of the vehicle 420 is higher than the second threshold speed, the controller 425 determines that there is a risk of collision.

The controller 425 warns a user of the risk of collision with a pedestrian (S490).

The controller 425 may notify the user of the collision risk in a manner such as audio, image, or vibration using a user interface. Moreover, the controller 425 may notify the terminal 410 of a collision risk through a collision risk message. Conversely, when there is no risk of collision or the risk disappears, the controller 425 may inform the use or the terminal 410 that there is no risk of collision.

Subsequently, the controller 425 determines that the risk of collision with the vehicle 420 disappears. By way of example, when the vehicle 420 is farther than a predetermined third threshold distance from the position of the intersection, the controller 425 may determine that the risk of collision with the vehicle 420 has disappeared. As another example, when candidate terminals or terminals of interest are located behind the vehicle 420, the controller 425 may determine that the risk of collision with the vehicle 420 has disappeared.

When the risk of collision with the vehicle 420 has disappeared, the controller 425 may deactivate the third communication module 421 and the fourth communication module 423 of the vehicle 420, and may initialize the list of the candidate terminals and the list of the terminals of interest in the memory 427.

FIGS. 6A, 6B, 6C, 6D, 6E, 6F, and 6G are illustrative diagrams depicting a right-turn assisting process of a vehicle according to an embodiment of the present disclosure.

Figure 6A:
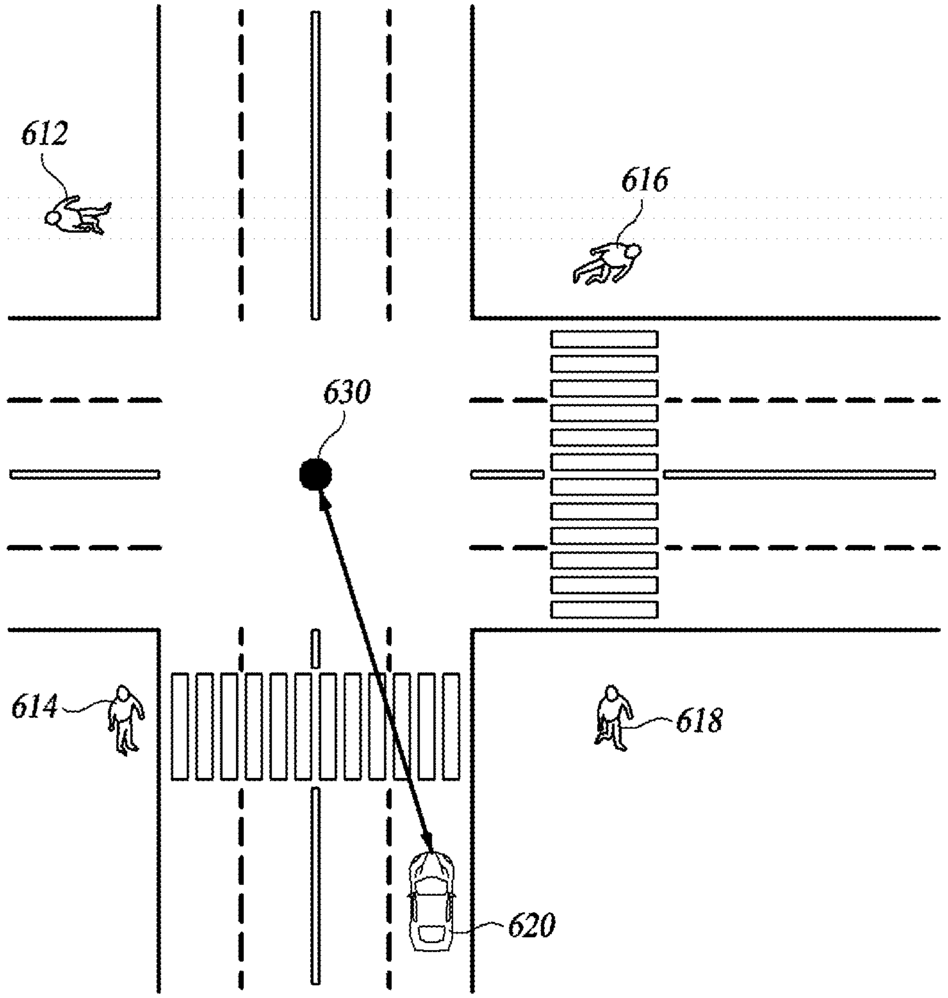
FIGS. 6A, 6B, 6C, 6D, 6E, 6F, and 6G are illustrative diagrams depicting a right-turn assisting process of a vehicle according to an embodiment of the present disclosure.

FIG. 6A shows a vehicle 620, a first pedestrian terminal 612, a second pedestrian terminal 614, a third pedestrian terminal 616, and a fourth pedestrian terminal 618. It is assumed that each pedestrian carries the terminal.

The vehicle 620 obtains an approach distance to a central position 630 of the intersection, determines the travel distance of the vehicle using an inertial measurement unit (IMU) and a distance measurement instrument (DMI), and compares the approach distance and the travel distance. When a distance between the approach distance and the travel distance is shorter than a preset first threshold distance, it is determined that the vehicle 620 is approaching the intersection. The vehicle 620 activates an internal BLE communication module.

Figure 6B:
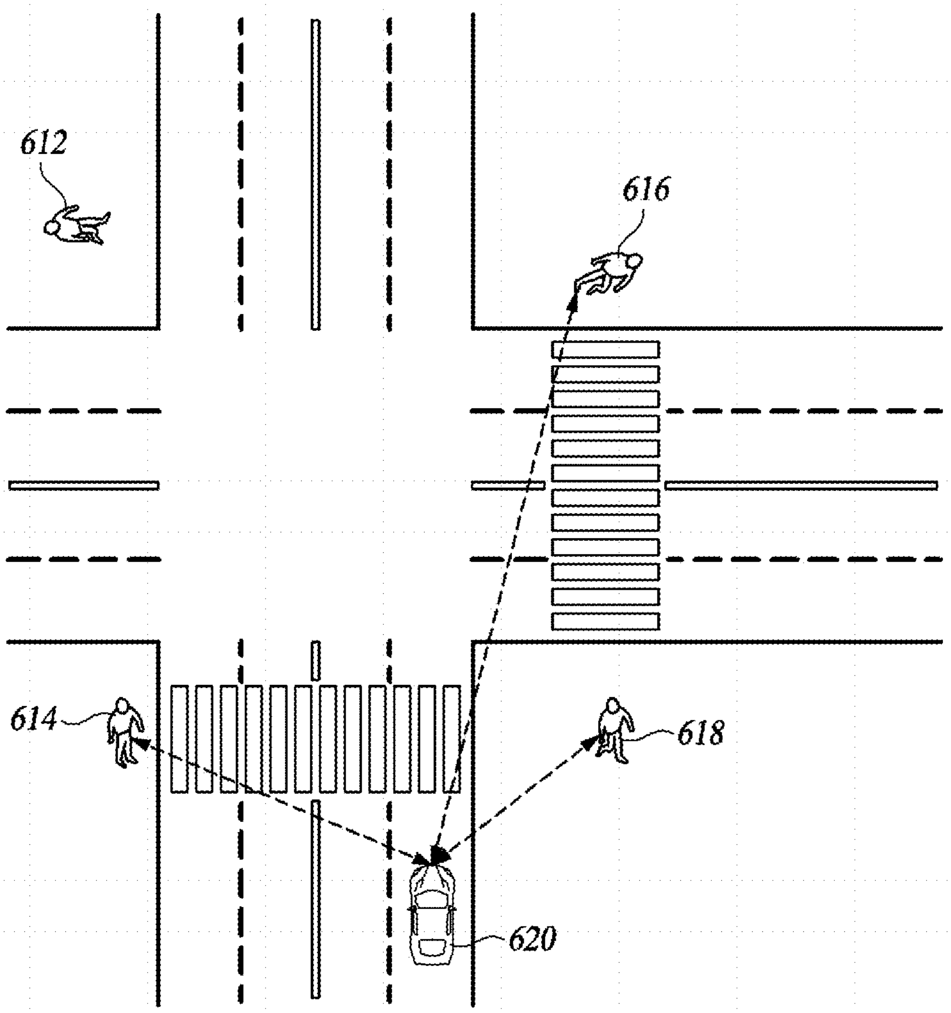

Referring to FIG. 6B, the vehicle 620 establishes a BLE session connection with the second pedestrian terminal 614, the third pedestrian terminal 616, and the fourth pedestrian terminal 618 using the BLE communication module. Due to a communication distance limit, the vehicle 620 may not establish the BLE session connection with the first pedestrian terminal 612. The vehicle 620 designates the second pedestrian terminal 614, the third pedestrian terminal 616, and the fourth pedestrian terminal 618 as candidate terminals, and stores the session ID and the signal intensity in a table form.

Figure 6C:
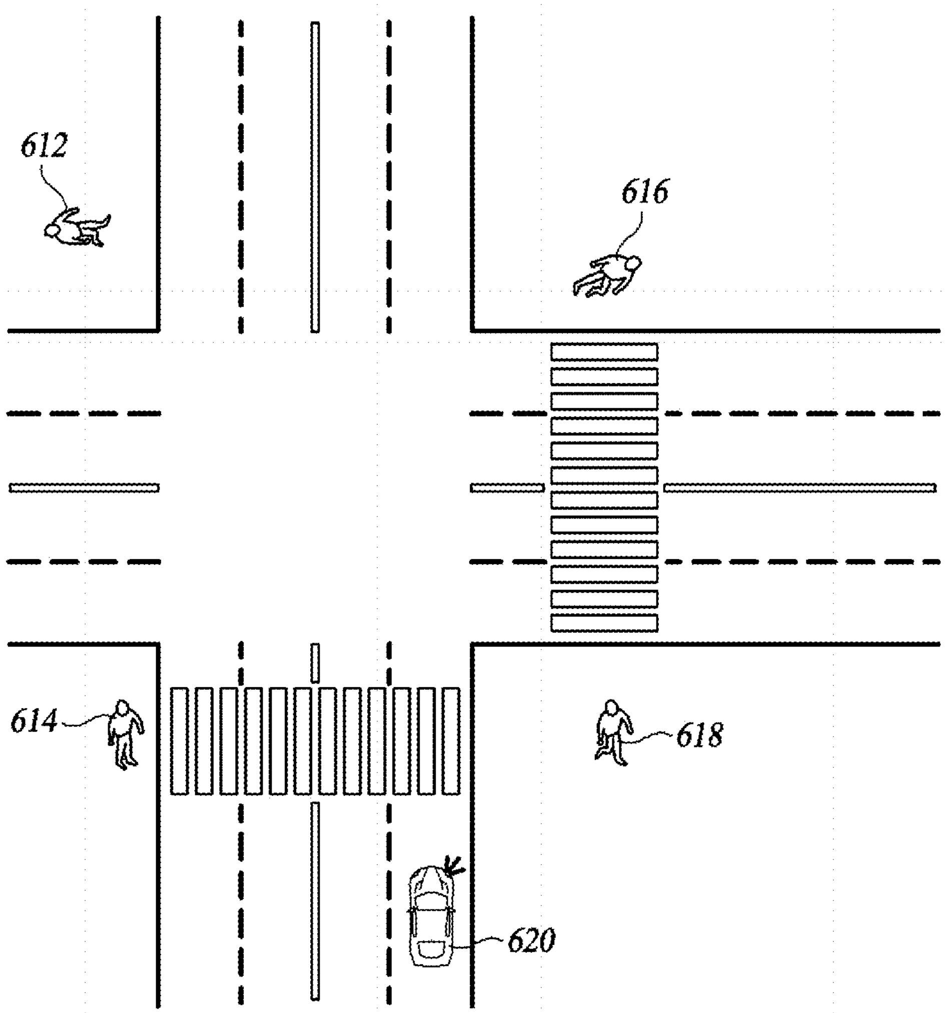

Referring to FIG. 6C, the vehicle 620 detects the driver's attempt to turn right by sensing the turn-on of the right-turn signal. When the right-turn attempt is detected, the vehicle 620 activates the UWB communication module.

Figure 6D:
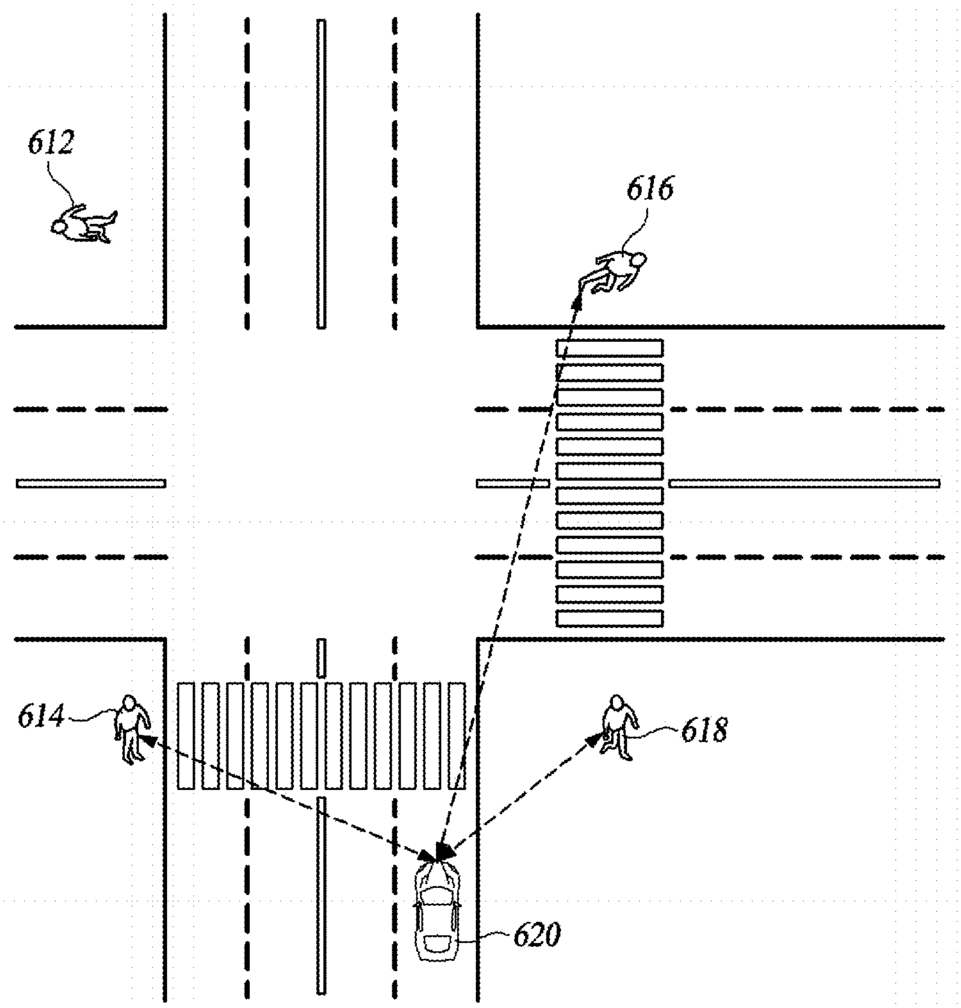

Referring to FIG. 6D, the vehicle 620 establishes the UWB session connection with the second pedestrian terminal 614, the third pedestrian terminal 616, and the fourth pedestrian terminal 618 using the UWB communication module, and estimates the position of each terminal.

At this time, the vehicle 620 performs UWB positioning only for the candidate terminals 614, 616, and 618 that form the BLE session connection. In other words, the vehicle 620 does not perform positioning on the first pedestrian terminal 612. By filtering terminals with a low risk of collision using the BLE communication module operating at low energy and performing positioning using the UWB communication module operating at relatively high energy, the vehicle 620 may accurately estimate the positions of dangerous terminals with at low energy.

Figure 6E:
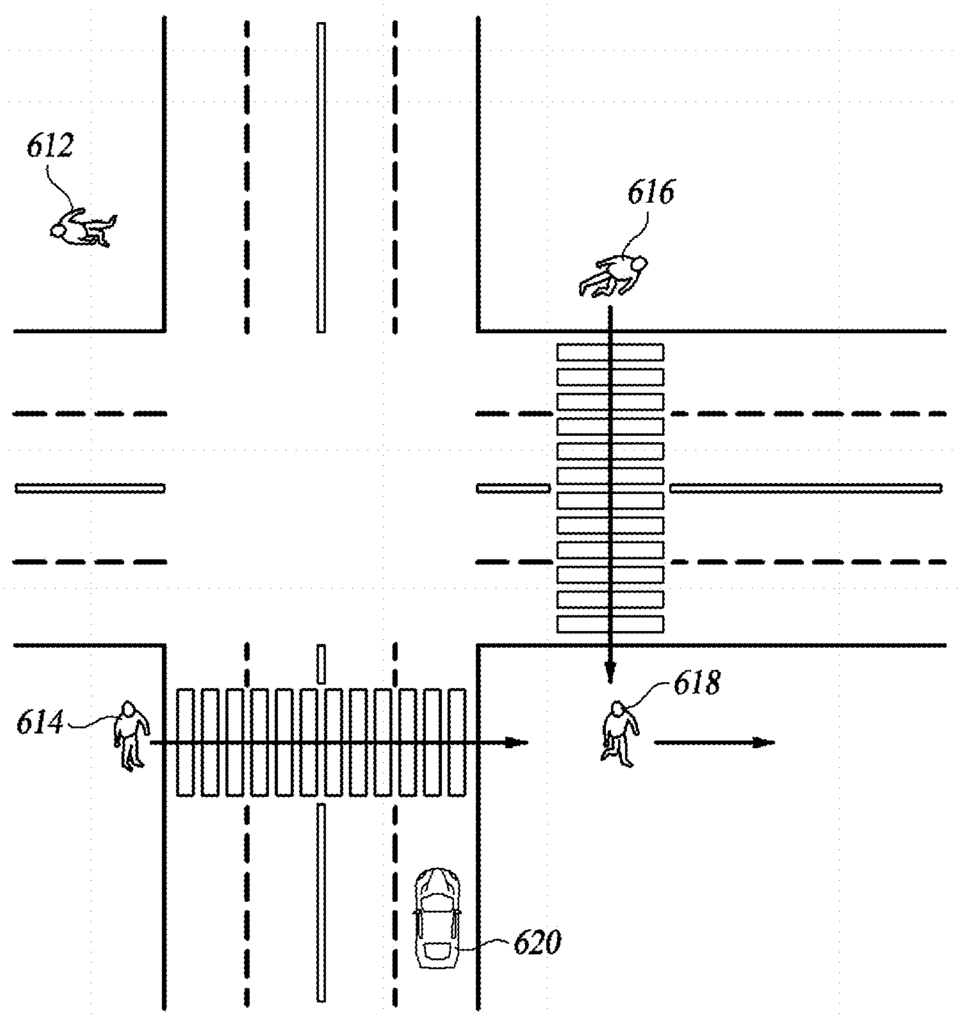

Referring to FIG. 6E, the vehicle 620 tracks the movement of the candidate terminals 614, 616, and 618, classifies the directions of the candidate terminals 614, 616, and 618, and selects the terminals of interest from the candidate terminals 614, 616, and 618. Since the second pedestrian terminal 614 is approaching from the left side of the vehicle 620 (Left Approach), it corresponds to the terminal of interest. Since the third pedestrian terminal 616 is approaching from the right side of the vehicle 620 (Right Oncoming), it corresponds to the terminal of interest. Since the fourth pedestrian terminal 618 is leaving from the right side of the vehicle 620 (Right Leaving), it does not correspond to the terminal of interest. That is, the second pedestrian terminal 614 and the third pedestrian terminal 616 are selected as the terminal of interest.

Figure 6F:
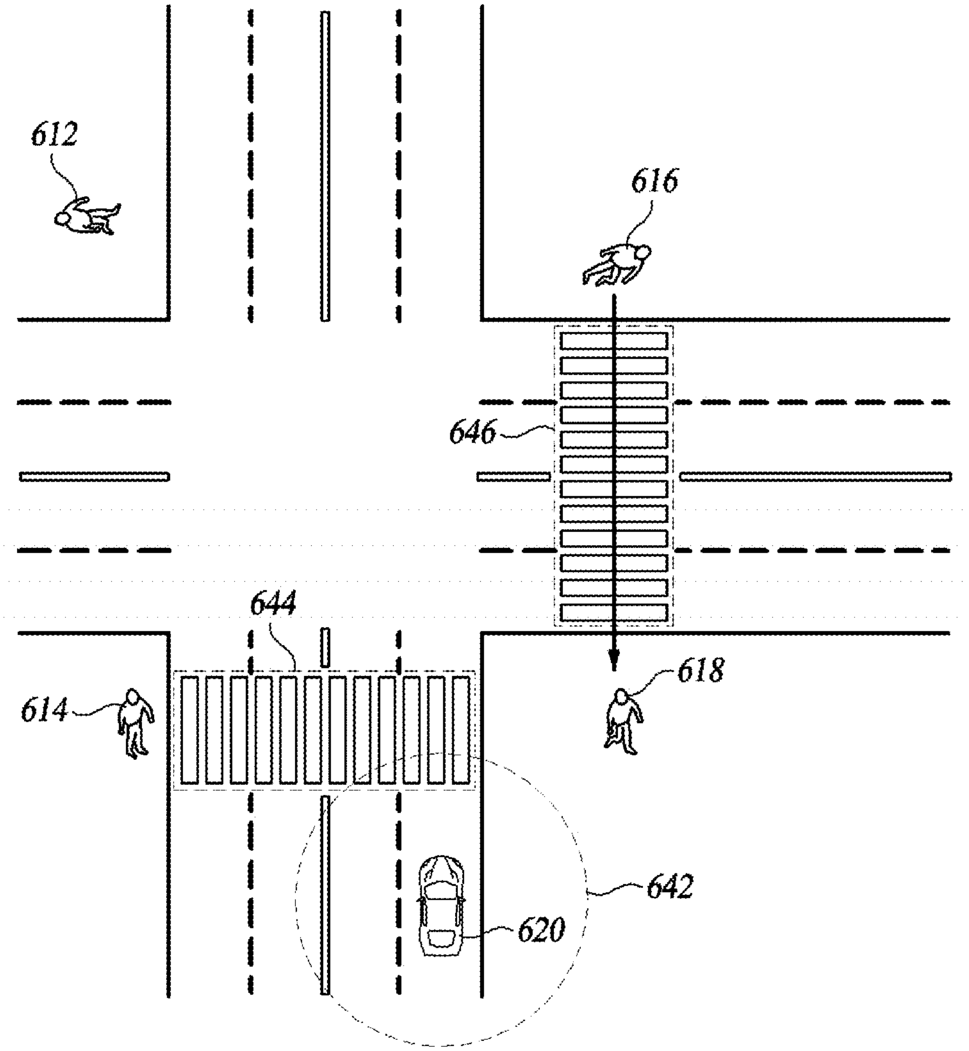

Referring to FIG. 6F, the vehicle 620 identifies an expected movement area for each of the terminals 614 and 616 of interest. The expected movement area may be a rectangle having the size of 5 m×15 m. As an example, the vehicle 620 may identify the first expected movement area 644 based on a position and a movement direction of the second pedestrian terminal 614. As another example, the vehicle 620 may identify a crosswalk area around the third pedestrian terminal 616 as the second expected movement area 646.

Thereafter, the vehicle 620 determines the dangerous area from a first expected movement area 644 and a second expected movement area 646. Specifically, the vehicle 620 generates a proximity area 642 having a predetermined radius from the center of the vehicle 620. Since the first expected movement area 644 overlaps the proximity area 642, the vehicle 620 determines the first expected movement area 644 as the dangerous area. On the other hand, since the second expected movement area 646 does not overlap the proximity area 642, the vehicle 620 determines that the second expected movement area 646 is not a dangerous area.

Figure 6G:
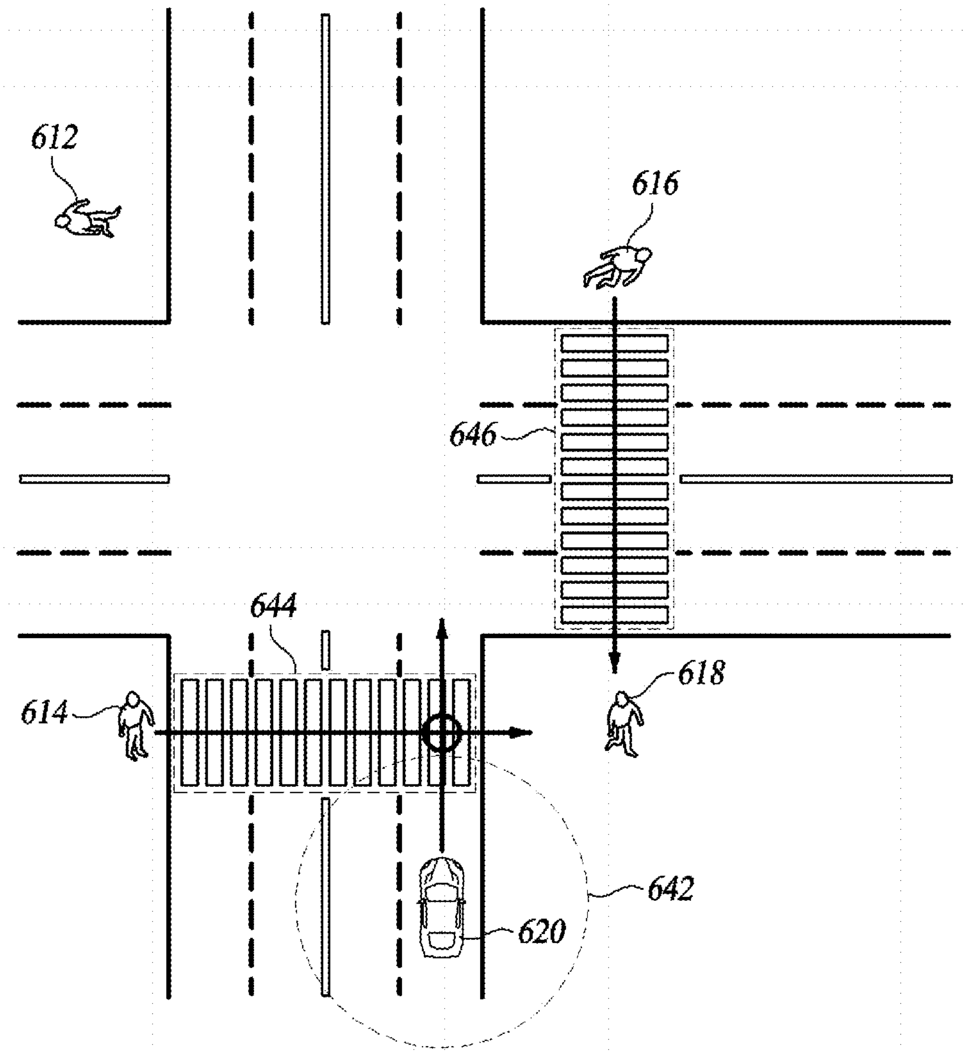

Referring to FIG. 6G, since there is an intersection between the direction of the second pedestrian terminal 614 and the predicted path of the vehicle 620 in the first expected movement area 644 which is a dangerous area, the vehicle 620 determines that there is a risk of collision with the second pedestrian terminal 614 when the speed of the vehicle 620 is higher than the preset second threshold speed.

The vehicle 620 warns a driver or a passenger of a risk of collision with a pedestrian. The vehicle 620 may also provide information such as the position and direction of the second pedestrian terminal 614.

Figure 7:
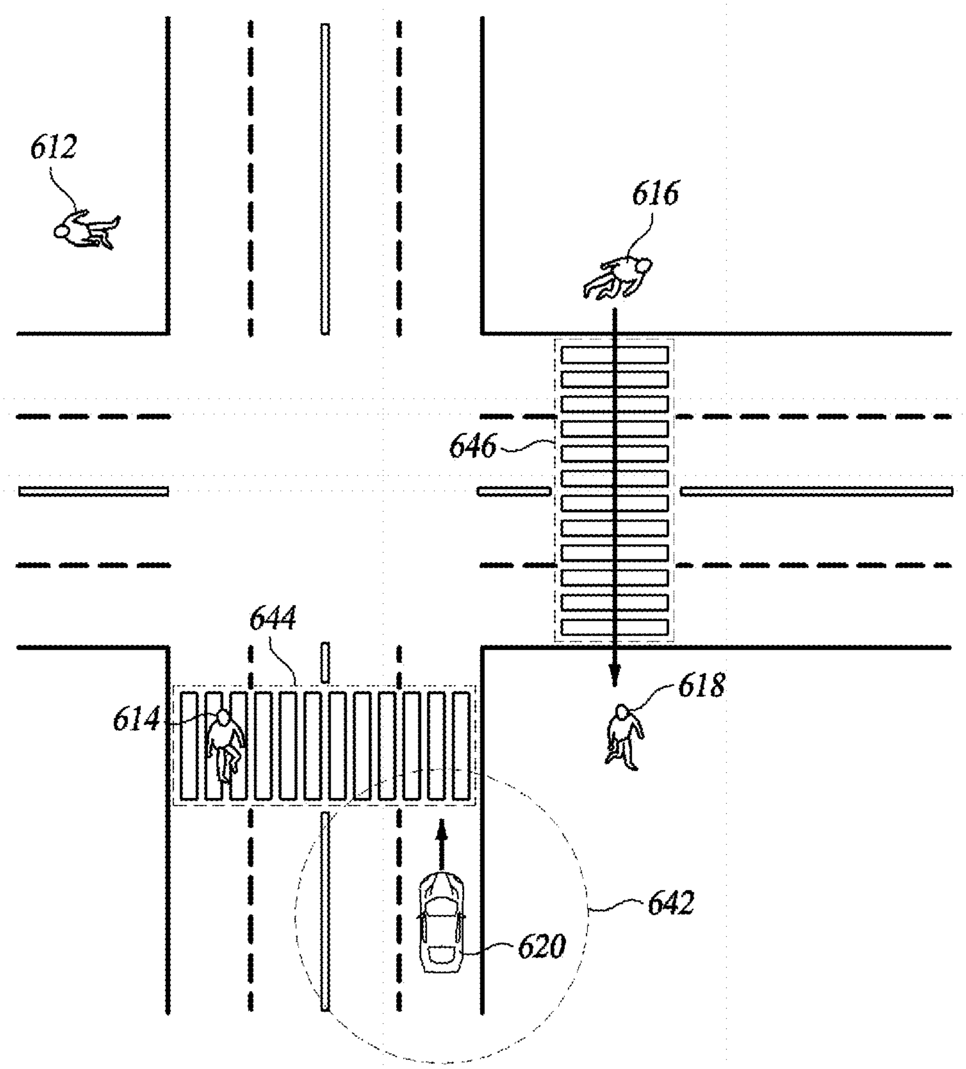
FIG. 7 is a diagram illustrating a criterion for determining the risk of collision according to an embodiment of the present disclosure.

FIG. 7 is a diagram illustrating a criterion for determining the risk of collision according to an embodiment of the present disclosure.

Referring to FIG. 7, when the pedestrian terminal 614 enters the first expected movement area 644 determined as the dangerous area and the speed of the vehicle 620 is higher than the preset second threshold speed, the vehicle 620 determines that there is a risk of collision with the second pedestrian terminal 614.

Figure 8:
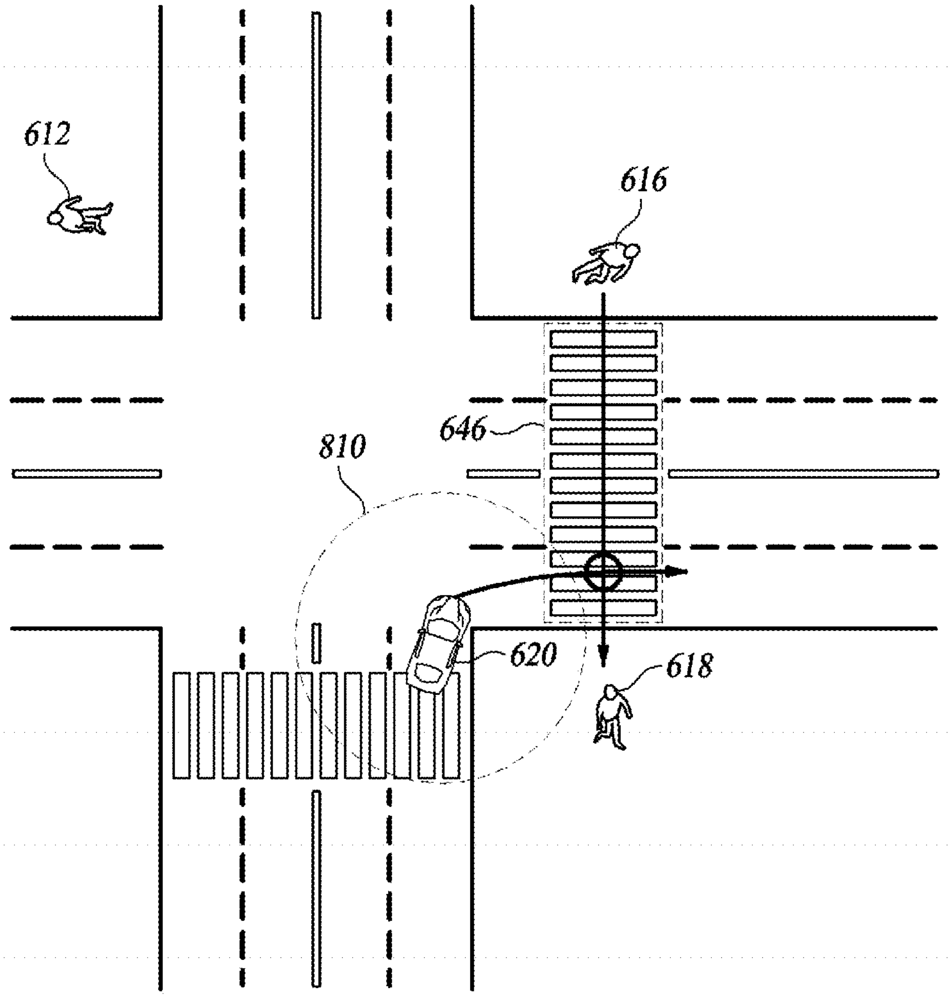
FIG. 8 is an illustrative diagram depicting a collision risk situation according to an embodiment of the present disclosure.

FIG. 8 is an illustrative diagram depicting a collision risk situation according to an embodiment of the present disclosure.

Referring to FIG. 8, since the second expected movement area 646 overlaps a proximity area 810, the vehicle 620 determines the second expected movement area 646 as a dangerous area. Since the yaw of the third pedestrian terminal 616 and the predicted path of the vehicle 620, i.e., the path according to the radius of curvature intersect, the vehicle 620 determines that there is a collision risk.

When the vehicle 620 is farther than a predetermined third threshold distance from the intersection, candidate terminals or terminals of interest are positioned behind the vehicle 620, or the right-turn signal of the vehicle 620 is turned off, the vehicle 620 stops tracking the position of the terminal and determining the risk of collision with the pedestrian.

Figure 9:
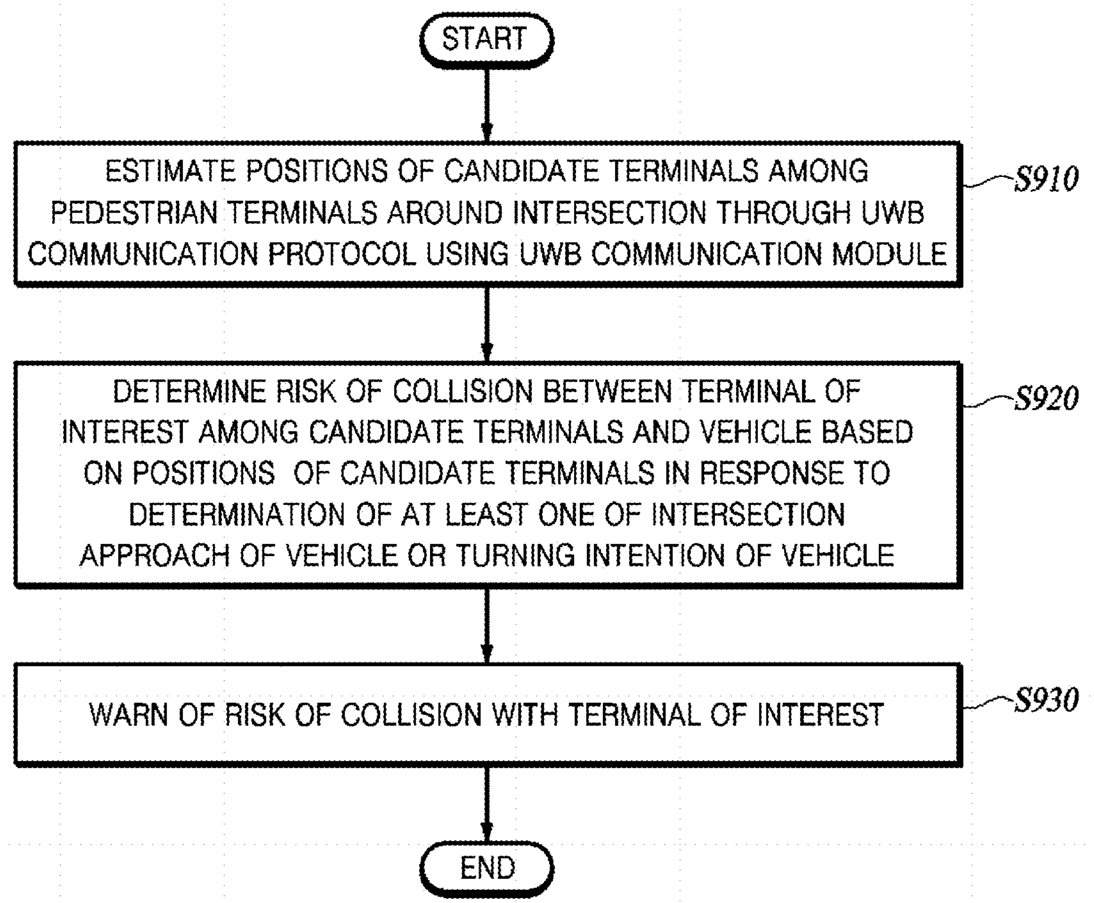
FIG. 9 is a flowchart of a right-turn assisting method of a vehicle according to an embodiment of the present disclosure.

FIG. 9 is a flowchart of a right-turn assisting method of a vehicle according to an embodiment of the present disclosure.

In FIG. 9, the UWB communication module may be referred to as a first communication device, and the BLE communication module may be referred to as a second communication module.

Referring to FIG. 9, a right-turn assisting apparatus estimates the positions of the candidate terminals among terminals of pedestrians around the intersection through the UWB communication protocol using the UWB communication module (S910).

First, the right-turn assisting apparatus determines the intersection approach of the vehicle based on the pre-stored map information. Specifically, the right-turn assisting apparatus obtains an approach distance between the central position of the intersection and the vehicle within the map information, determines the movement distance of the vehicle using the IMU and the DMI, and determines that the vehicle is approaching the intersection by comparing the approach distance and the travel distance.

The right-turn assisting apparatus may activate the BLE communication module based on the determination of the intersection approach of the vehicle.

Subsequently, the right-turn assisting apparatus determines the turning intention of vehicle based on at least one of the vehicle's turn signal or navigation. For example, when the right-turn signal of the vehicle is turned on, the right-turn assisting apparatus determines that the vehicle has an intention to turn right. Alternatively, when the vehicle's navigation path bends at the intersection, the right-turn assisting apparatus determines that the vehicle intends to turn left or right.

The right-turn assisting apparatus may activate the UWB communication module according to the turning intention of the vehicle.

The right-turn assisting apparatus attempts to connect with terminals of pedestrians around the intersection using the BLE communication protocol, and designates the terminals connected in communication as candidate terminals. Then, the right-turn assisting apparatus estimates the positions and the directions of the candidate terminals using the UWB communication protocol. In this regard, the BLE communication protocol has lower power and a wider communication range than the UWB communication protocol, whereas the UWB communication protocol has higher positioning accuracy than the BLE communication protocol.

The right-turn assisting apparatus estimates the positions of the candidate terminals using the UWB communication module. The right-turn assisting apparatus may estimate the positions of the candidate terminals based on priority according to the BLE received signal intensity.

Subsequently, the right-turn assisting apparatus determines collision risk between the terminal of interest among candidate terminals and the vehicle based on the positions of the candidate terminals in response to the determination of at least one of the to the intersection approach of the vehicle or the turning intention of the vehicle (S920).

First, the right-turn assisting apparatus selects the terminal of interest from the candidate terminals. Specifically, the right-turn assisting apparatus classifies the movement types of the candidate terminals according to positions and directions relative to the vehicle, and selects the candidate terminal according to a target movement type among the candidate terminals as the terminal of interest.

For example, the right-turn assisting apparatus classifies classes of candidate terminals based on nine classification classes that are preset according to directions. Specifically, among them, candidate terminals having directions approaching the vehicle may be selected as terminals of interest.

The right-turn assisting apparatus identifies the expected movement area according to the position and the direction of the terminal of interest. For instance, the right-turn assisting apparatus may identify an expected movement area of a predetermined size in the direction of the terminal of interest from the position of the terminal of interest.

The right-turn assisting apparatus estimates a distance between the expected movement area and the vehicle, and determines the expected movement area as a dangerous area when the distance between the expected movement area and the vehicle is shorter than the preset second threshold distance. For example, when the radius of the predetermined size of the vehicle and the expected movement area at least partially overlap, the right-turn assisting apparatus may determine the expected movement area as the dangerous area.

The right-turn assisting apparatus determines the risk of collision between the vehicle and the terminal of interest within the dangerous area. As an example, the right-turn assisting apparatus may determine the risk of collision based on whether the terminal of interest has moved to the dangerous area and the speed of the vehicle. As another example, the right-turn assisting apparatus may determine the risk of collision based on whether the direction of the terminal of interest and the vehicle navigation path intersect in the dangerous area, and the speed of the vehicle.

The right-turn assisting apparatus warns of the risk of collision with the terminal of interest (S950).

According to an embodiment, an apparatus and method for assisting a right turn of a vehicle detects a pedestrian that a sensor cannot detect when a vehicle turns right at an intersection through first communication with a pedestrian terminal within a limited system having no V2X module, and accurately and precisely estimates the position of the pedestrian, thus effectively preventing a collision with a pedestrian.

According to an embodiment, an apparatus and method for assisting a right turn of a vehicle uses a UWB module installed in the vehicle and a UWB module installed in a smartphone, thus being capable of performing a pedestrian collision prevention function with little system setup.

According to an embodiment, an apparatus and method for assisting a right turn of a vehicle uses a Bluetooth module that operates with low energy and a UWB module that can perform high-precision positioning in combination, thus allowing high-accuracy positioning to be performed at low energy.

The effects of the present disclosure are not limited to the effects mentioned above, and other effects not mentioned will be clearly understood by those skilled in the art from the description.

At least some of the components described in the exemplary embodiments of the present disclosure may be implemented as hardware elements including at least one of a Digital Signal Processor (DSP), a processor, a controller, an Application-Specific IC (ASIC), a programmable logic devices (FPGA, etc.), other electronic components, or a combination thereof. Moreover, at least some of the functions or processes described in the exemplary embodiments may be implemented as software, and the software may be stored in a recording medium. At least some of the components, functions, and processes described in the exemplary embodiments of the present disclosure may be implemented as a combination of hardware and software.

The method according to the exemplary embodiments of the present disclosure may be written as a program that can be executed on a computer and may also be implemented as various recording media such as magnetic storage media, optical reading media, digital storage media, etc.

Various techniques described herein may be implemented in digital electronic circuitry, or in computer hardware, firmware, software, or combinations thereof. Implementations may be in the form of a computer program tangibly embodied in a computer program product, i.e., an information carrier, e.g., a machine-readable storage device (computer-readable medium) or a propagated signal, for processing by, or controlling, the operation of, a data processing device, e.g., a programmable processor, a computer, or a number of computers. A computer program, such as the above-mentioned computer program(s), may be written in any form of programming language, including compiled or interpreted languages and may be deployed in any form, including as a stand-alone program or as a module, component, subroutine, or other unit suitable for use in a computing environment. The computer program may be deployed to run on a single computer or multiple computers at one site or distributed across multiple sites and interconnected by a communications network.

In addition, components of the present disclosure may use an integrated circuit structure such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, etc. that perform respective functions. In addition, components of the present disclosure may store instructions executed by one or more processors in one or more memories.

Processors suitable for processing computer programs include, by way of example, both general purpose and special purpose microprocessors, as well as one or more processors of any kind of digital computer. Generally, a processor will receive instructions and data from a read-only memory or a random access memory or both. The essential elements of a computer may include at least one processor that executes instructions and one or more memory devices that store instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include, by way of example, semiconductor memory devices, e.g., Magnetic Media such as hard disks, floppy disks, and magnetic tapes, Optical Media such as Compact Disk Read Only Memories (CD-ROMs) and Digital Video Disks (DVDs), Magneto-Optical Medial such as Floptical Disks, Rea Only Memories (ROMs), Random Access Memories (RAMs), flash memories, Erasable Programmable ROMs (EPROMs), Electrically Erasable Programmable ROMs (EEPROM), etc. The processor and the memory may be supplemented by, or incorporated in, special purpose logic circuitry.

The processor may execute an Operating System and software applications executed on the Operating System. Moreover, a processor device may access, store, manipulate, process, and generate data in response to software execution. For the sake of convenience, there is a case where a single processor device is used, but those skilled in the art will understand that the processor device can include multiple processing elements and/or multiple types of processing elements. For example, the processor device may include a plurality of processors or a single processor and a single controller. Other processing configurations, such as such as parallel processors, are also possible.

In addition, non-transitory computer-readable media may be any available media that can be accessed by a computer, and may include both computer storage media and transmission media.

This specification includes details of various specific implementations, but they should not be understood as limiting the scope of any invention or what is claimed, and should be understood as descriptions of features that may be unique to particular embodiments of a particular invention. In the context of individual embodiments, specific features described herein may also be implemented in combination with a single embodiment. On the contrary, various features described in the context of a single embodiment can also be implemented in multiple embodiments independently or in any appropriate sub-combination. Further, although the features may operate in a particular combination and may be initially described as so claimed, one or more features from the claimed combination may be in some cases excluded from the combination, and the claimed combination may be modified into a sub-combination or a variation of the sub-combination.

Likewise, although the operations are depicted in the drawings in a particular order, it should not be understood that such operations must be performed in that particular order or sequential order shown to achieve the desirable result or that all the depicted operations should be performed. In certain cases, multitasking and parallel processing may be advantageous. Moreover, the separation of various device components of the above-described embodiments should not be understood as requiring such separation in all embodiments, and it should be understood that the described program components and devices can generally be integrated together in a single software product or packaged into multiple software products.

The foregoing description is merely illustrative of the technical concept of the present embodiments. Various modifications and changes may be made by those of ordinary skill in the art without departing from the essential characteristics of each embodiment. Therefore, the present embodiments are not intended to limit but to describe the technical idea of the present embodiments. The scope of the technical concept of the embodiments is not limited by these embodiments. The scope of protection of the various embodiments should be construed by the following claims. All technical ideas that fall within the scope of equivalents thereof should be interpreted as being included in the scope of the present embodiments.

What is claimed is:

1. A right-turn assisting apparatus of a vehicle for preventing a collision with a pedestrian at an intersection, the apparatus comprising:

a communication unit including a first communication module configured to estimate positions of candidate terminals among pedestrian terminals around the intersection through a first communication protocol; and a controller configured to determine a risk of collision between a terminal of interest among the candidate terminals and the vehicle based on the positions of the candidate terminals, in response to determination of at least one of an intersection approach of the vehicle or a turning intention of the vehicle, and warn of the risk of collision with the terminal of interest.

2. The apparatus of claim 1, wherein the communication unit further comprises a second communication module having a lower power and a wider communication range than the first communication module, and wherein the controller is further configured to designate, as the candidate terminals, terminals connected to the second communication module among the pedestrian terminals.

3. The apparatus of claim 2, wherein the first communication module is configured to estimate the positions of the candidate terminals based on priority according to an intensity of a signal received by the second communication module.

4. The apparatus of claim 2, wherein the second communication module is activated in response to the determination that the vehicle is approaching the intersection, and wherein the first communication module is activated according to the turning intention of the vehicle.

5. The apparatus of claim 1, wherein the controller is further configured to:

obtain an approach distance between a central position of the intersection within pre-stored map information and the vehicle;

determine a travel distance of the vehicle using an inertial measurement unit (IMU) and a distance measurement instrument (DMI); and determine the intersection approach of the vehicle by comparing the approach distance and the travel distance.

6. The apparatus of claim 1, wherein the controller is configured to determine the turning intention of the vehicle based on at least one of a turn signal or a navigation path of the vehicle.

7. The apparatus of claim 1, wherein the controller is further configured to:

classify movement types of the candidate terminals according to positions and directions relative to the vehicle;

select a candidate terminal having a target movement type as the terminal of interest;

determine an expected movement area according to a position and a direction of the terminal of interest;

determine that the expected movement area is a dangerous area in response to a distance between the expected movement area and the vehicle being shorter than a preset threshold distance; and determine the risk of collision between the vehicle and the terminal of interest in the dangerous area.

8. The apparatus of claim 7, wherein the controller is configured to determine the risk of collision based on whether the terminal of interest has entered the dangerous area, and a vehicle speed.

9. The apparatus of claim 7, wherein the controller is configured to determine the risk of collision based on whether the direction of the terminal of interest and a navigation path of the vehicle intersect in the dangerous area, and a vehicle speed.

10. A method of controlling a right-turn assisting apparatus of a vehicle for preventing a collision with a pedestrian at an intersection, the method comprising:

estimating, by a first communication module and through a first communication protocol, positions of candidate terminals among pedestrian terminals around the intersection;

determining, by a controller, a risk of collision between a terminal of interest among the candidate terminals and the vehicle based on the positions of the candidate terminals, in response to determination of at least one of an intersection approach of the vehicle or a turning intention of the vehicle; and warning, by the controller, of the risk of collision with the terminal of interest.

11. The method of claim 10, further comprising:

designating, by the controller, terminals connected to a second communication module among the pedestrian terminals as the candidate terminals, wherein the second communication module has a lower power and a wider communication range than the first communication module.

12. The method of claim 11, wherein the estimating the positions of the candidate terminals comprises:

estimating, by the communication module, the positions of the candidate terminals based on priority according to an intensity of a signal received by the second communication module.

13. The method of claim 11, further comprising:

activating, by the apparatus, the second communication module in response to the determination that the vehicle is approaching the intersection; and activating, by the apparatus, the first communication module according to the turning intention of the vehicle.

14. The method of claim 10, further comprising:

obtaining, by the controller, an approach distance between a central position of the intersection within pre-stored map information and the vehicle;

determining, by the controller, a travel distance of the vehicle using an inertial measurement unit (IMU) and a distance measurement instrument (DMI); and determining, by the controller, the intersection approach of the vehicle by comparing the approach distance and the travel distance.

15. The method of claim 10, further comprising:

determining, by the controller, the turn intention of the vehicle based on at least one of a turn signal or a navigation path of the vehicle.

16. The method of claim 10, wherein the determining of the risk of collision comprises:

classifying, by the controller, movement types of the candidate terminals according to positions and directions relative to the vehicle;

selecting, by the controller, a candidate terminal having a target movement type as the terminal of interest;

determining, by the controller, an expected movement area according to a position and a direction of the terminal of interest;

determining, by the controller, that the expected movement area is a dangerous area in response to a distance between the expected movement area and the vehicle being shorter than a preset threshold distance; and determining, by the controller, the risk of collision between the vehicle and the terminal of interest in the dangerous area.

17. The method of claim 16, wherein the determining of the risk of collision comprises:

determining, by the controller, the risk of collision based on whether the terminal of interest has entered the dangerous area, and a vehicle speed.

18. The method of claim 16, wherein the determining of the risk of collision comprises:

determining, by the controller, the risk of collision based on whether the direction of the terminal of interest and a navigation path of the vehicle intersect in the dangerous area, and a vehicle speed.

* * * * *